(12) United States Patent
Zhang

(10) Patent No.: US 12,069,349 B2
(45) Date of Patent: Aug. 20, 2024

(54) METHOD, APPARATUS AND ELECTRONIC DEVICE OF PAGE DISPLAY FOR APPLICATION

(71) Applicant: BEIJING ZITIAO NETWORK TECHNOLOGY CO., LTD., Beijing (CN)

(72) Inventor: Ke Zhang, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 231 days.

(21) Appl. No.: 17/518,320

(22) Filed: Nov. 3, 2021

(65) Prior Publication Data
US 2022/0369003 A1  Nov. 17, 2022

(30) Foreign Application Priority Data
May 14, 2021 (CN) .......................... 202110529372.3

(51) Int. Cl.
 *H04N 7/10* (2006.01)
 *G06F 3/04817* (2022.01)
 *H04N 21/8545* (2011.01)
(52) U.S. Cl.
 CPC ..... *H04N 21/8545* (2013.01); *G06F 3/04817* (2013.01)
(58) Field of Classification Search
 CPC ........... H04N 21/8545; H04N 21/2187; H04N 21/4312; H04N 21/485; H04N 21/8173; G06F 3/04817; G06F 3/0488; G06F 9/451
 USPC ......................................................... 725/34
 See application file for complete search history.

(56) References Cited

U.S. PATENT DOCUMENTS

| | | | |
|---|---|---|---|
| 11,122,307 B2 * | 9/2021 | Wu | .................. H04N 21/4126 |
| 11,178,471 B2 * | 11/2021 | Cui | .................. H04N 21/4312 |
| 2007/0160345 A1 | 7/2007 | Sakai et al. | |
| 2010/0333036 A1 | 12/2010 | Matsuyama | |

(Continued)

FOREIGN PATENT DOCUMENTS

| | | |
|---|---|---|
| CN | 108037861 A | 5/2018 |
| CN | 108134964 A | 6/2018 |

(Continued)

OTHER PUBLICATIONS

Search Report issued Jul. 11, 2022 for PCT Application No. PCT/CN2022/090438.

(Continued)

*Primary Examiner* — Jefferey F Harold
*Assistant Examiner* — Sahar Aqil Riaz

(57) ABSTRACT

The invention relates to a method, apparatus and electronic device of page display for application. The method comprises: receiving a play instruction for a multimedia content in an application, wherein the multimedia content is configured with a target prop, and the target prop is used for influencing the playing effect of the multimedia content; in response to the play instruction, in a playing page of the application, playing the multimedia content, and dynamically displaying an icon of the target prop in an icon of a publisher, the publisher being used for creating a new multimedia content configured with the target prop and/or turning on a new virtual live studio configured with the target prop.

20 Claims, 10 Drawing Sheets receive a play instruction for a multimedia content in an application, wherein the multimedia content is configured with a target prop, and the target prop is used for influencing the playing effect of the multimedia content — S101 in response to the play instruction, in a playing page of the application, play the multimedia content, and dynamically display an icon of the target prop in an icon of a publisher, the publisher being used for creating a new multimedia content configured with the target prop and/or turning on a new virtual live studio configured with the target prop — S102

(56) References Cited

U.S. PATENT DOCUMENTS

| | | | |
|---|---|---|---|
| 2011/0010667 A1* | 1/2011 | Sakai | G06F 3/0482 715/810 |
| 2011/0320477 A1 | 12/2011 | Nestler et al. | |
| 2017/0171277 A1* | 6/2017 | Shi | H04N 21/251 |
| 2017/0171599 A1* | 6/2017 | Peng | G06F 3/14 |
| 2019/0026004 A1 | 1/2019 | Caen | |
| 2019/0124400 A1 | 4/2019 | Wang et al. | |
| 2019/0205938 A1* | 7/2019 | Van Winkle | G06Q 30/0273 |
| 2020/0336804 A1* | 10/2020 | Cui | H04N 21/4781 |
| 2022/0377259 A1* | 11/2022 | Li | H04N 23/60 |
| 2023/0224511 A1* | 7/2023 | Fan | H04N 21/44004 725/32 |

FOREIGN PATENT DOCUMENTS

| | | |
|---|---|---|
| CN | 110191351 A | 8/2019 |
| CN | 110310224 A | 10/2019 |
| CN | 110941336 A | 3/2020 |
| CN | 112114925 A | 12/2020 |
| CN | 112346632 A | 2/2021 |
| CN | 112516583 A | 3/2021 |
| CN | 112637518 A | 4/2021 |
| CN | 113286159 A | 8/2021 |
| JP | 2001069456 A | 3/2001 |
| KR | 10-2008-0073403 A1 | 8/2008 |
| KR | 10-1530517 B1 | 6/2015 |
| RU | 2465740 C2 | 10/2012 |
| WO | WO2005/109157 A1 | 11/2005 |

OTHER PUBLICATIONS

Notice of Allowance issue Apr. 29, 2022 for CN Application No. 202110529372.3.
Request for the Submission of an Opinion issued Mar. 14, 2024 in KR App. No. 10-2023-7040358, English translation (12 pages).
Extended EP Search Report issued Mar. 28, 2024 in EP Appl. 22806562.9, English translation (9 pages).
Office action received from Russian patent application No. 2023132440 mailed on Apr. 25, 2024, 26 pages (11 pages English Translation and 15 pages Original Copy).
Notice of Reasons for Refusal issued May 29, 2024 in JP Appl. No. 2023-570128, English translation (5 pages).

* cited by examiner

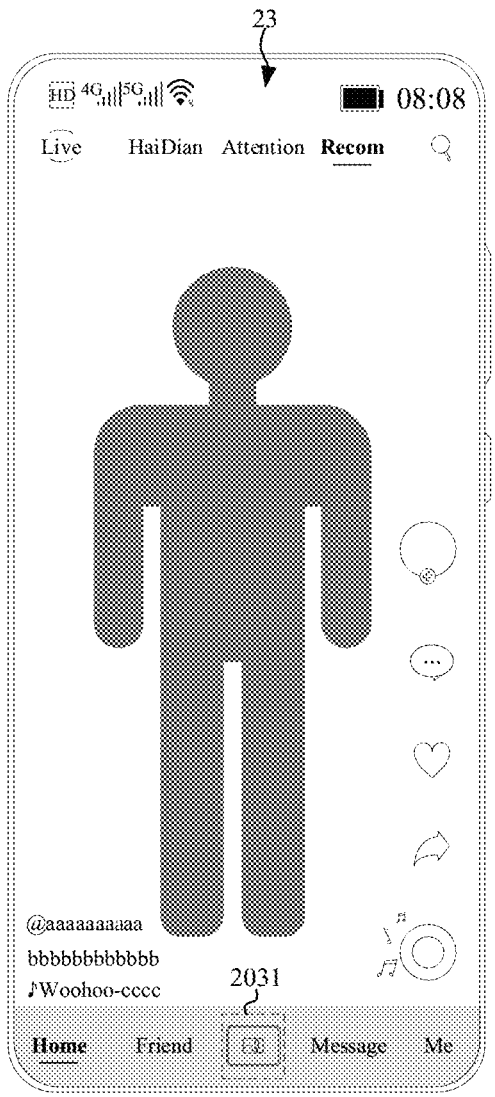
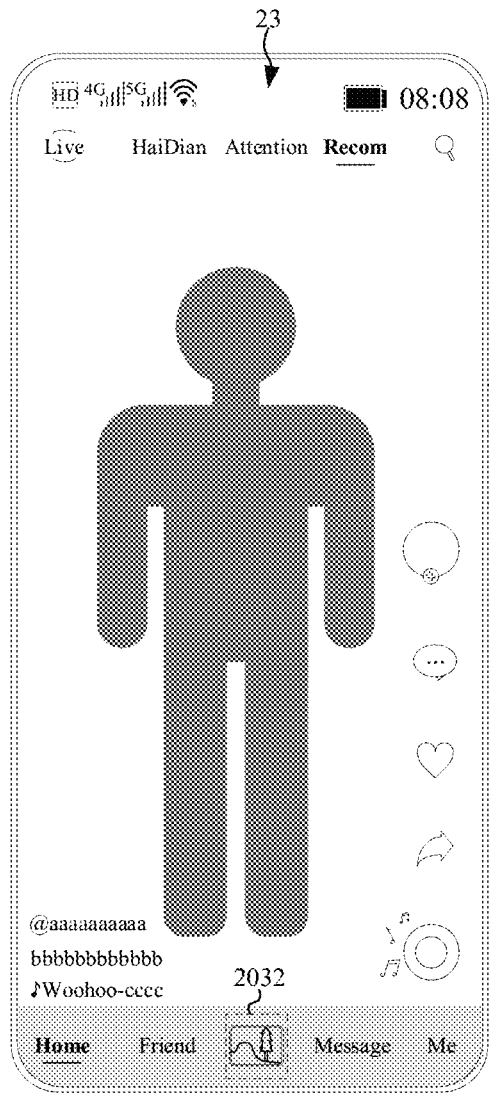
FIG.3D                    FIG.3E

METHOD, APPARATUS AND ELECTRONIC DEVICE OF PAGE DISPLAY FOR APPLICATION

CROSS-REFERENCE TO RELATED APPLICATIONS

This application claims priority to Chinese Patent Application No. 202110529372.3, filed on May 14, 2021, the disclosure of which is hereby incorporated by reference in its entirety.

FIELD OF THE INVENTION

The disclosure relates to the technical field of computers, in particular to a method, apparatus and electronic device of page display for application.

BACKGROUND

With continuous development of Internet technology, applications (APPs) can show various multimedia contents to users, enrich their lives, and enable different users to share multimedia contents with each other in the form of videos.

At present, users often use props in multimedia contents to influence or change the playing effect of multimedia contents, so that the multimedia contents can be presented in a colorful way. At the same time, users can also use the same props to create new multimedia contents in the application.

Therefore, how to facilitate the user to quickly use the props used in multimedia contents when the props are displayed is an urgent problem to be solved.

DISCLOSURE OF THE INVENTION

In order to solve the above technical problem or at least partially solve the above technical problem, the present disclosure provides method, apparatus and electronic device of page display for application In a first aspect, the present disclosure provides a page display method for an application, which includes:

receiving a play instruction for a multimedia content in an application, wherein the multimedia content is generated by adopting a target prop, and the target prop is used for influencing the playing effect of the multimedia content;

in response to the play instruction, in a playing page of the application, playing the multimedia content, and dynamically displaying an icon of the target prop in an icon of a publisher, the publisher being used for creating a new multimedia content configured with the target prop and/or turning on a new virtual live studio configured with the target prop.

By the method in the first aspect, upon a play instruction for a multimedia content in an application configured with a target prop is received, in a playing page of the application, the multimedia content is played, and an icon of the target prop is dynamically displayed in an icon of a publisher, which can realize functional combination of the publisher and the prop, so that the user can create a new multimedia content configured with the target prop and/or turn on a new virtual live studio configured with the target prop. Therefore, while the application plays the multimedia content, dynamic presentation of the prop in the publisher can be implemented vividly, which can present the prop configured in the multimedia content interestingly, solve a problem of lack of guiding users to perform creation and/or interaction in the application, increase the probability and interest that the application reminds users to use the prop for creation and/or turn on a virtual live studio for interaction, prompt more users to create and/or output contents in the application, and also avoid a phenomenon that users need to adopt complicated operations when using props, so that users can use props conveniently and quickly, and the user's experience in using the application can be improved.

In a possible design, when the icon of the target prop does not match the icon of the publisher, dynamically displaying the icon of the target prop in the icon of the publisher comprises: causing the icon of the target prop from interior of the icon of the publisher to penetrate to exterior of the publisher for dynamic displaying.

In a possible design, when the icon of the target prop matches the icon of the publisher, dynamically displaying the icon of the target prop in the icon of the publisher comprises: changing the icon of the target prop from a decreased state located inside the icon of the publisher to an enlarged state embedded in the icon of the publisher for dynamic display.

In a possible design, the method further comprises: upon receipt of a trigger instruction to the publisher, displaying a shooting page of the application, wherein the shooting page is used for creating a new multimedia content configured with the target prop and/or turning on a new virtual live studio configured with the target prop. Therefore, it can avoid a phenomenon that users need to adopt complicated operations when using props, so that users can enter into the shooting page utilizing the prop conveniently and quickly, and creation and/or interaction of multimedia contents can be implemented.

In a possible design, the method further comprises: upon receipt of a sliding instruction for the playing page, acquiring a type identifier of the multimedia content; adding the type identifier of the multimedia content into the icon of the publisher; and displaying the icon of the publisher in the playing page.

In a possible design, when the type identifier of the multimedia content indicates that the type of the multimedia content is a shared multimedia content, the publisher is used for creating multimedia contents; or, when the type identifier of the multimedia content indicates that the type of the multimedia content is a live picture in a virtual live studio, the publisher is used to turn on the virtual live studio.

In a possible design, the method further comprises: upon receipt of a configuration instruction corresponding to shaking of an electronic device, displaying the publisher with a deformed icon in the playing page.

In a second aspect, the present disclosure provides a page display apparatus for an application, which includes:

a receiving module configured to receive a play instruction for a multimedia content in an application, wherein the multimedia content is configured with a target prop, and the target prop is used for influencing the playing effect of the multimedia content;

a processing module configured to, in response to the play instruction, in a playing page of the application, play the multimedia content, and dynamically display an icon of the target prop in an icon of a publisher, the publisher being used for creating a new multimedia content configured with the target prop and/or turning on a new virtual live studio configured with the target prop.

In a possible design, the processing module is configured to, when the icon of the target prop does not match the icon of the publisher, cause the icon of the target prop from interior of the icon of the publisher to penetrate to exterior of the publisher for dynamic displaying.

In a possible design, the processing module is configured to, when the icon of the target prop matches the icon of the publisher, change the icon of the target prop from a decreased state located inside the icon of the publisher to an enlarged state embedded in the icon of the publisher for dynamic display.

In a possible design, the processing module is further configured to, upon receipt of a trigger instruction to the publisher, display a shooting page of the application, wherein the shooting page is used for creating a new multimedia content configured with the target prop and/or turning on a new virtual live studio configured with the target prop.

In a possible design, the processing module is further configured to, upon receipt of a sliding instruction for the playing page, acquire a type identifier of the multimedia content; add the type identifier of the multimedia content into the icon of the publisher; and display the icon of the publisher in the playing page.

In a possible design, when the type identifier of the multimedia content indicates that the type of the multimedia content is a shared multimedia content, the publisher is used for creating multimedia contents; or, when the type identifier of the multimedia content indicates that the type of the multimedia content is a live picture in a virtual live studio, the publisher is used to turn on the virtual live studio.

In a possible design, the processing module is configured to, upon receipt of a configuration instruction corresponding to shaking of an electronic device, display the publisher with a deformed icon in the playing page.

The page display apparatus for the application provided in the above second aspect and various possible designs of the above second aspect can achieve advantageous effects which can refer to the advantageous effects achieved by the above first aspect and various possible implementations of the first aspect, and will not be described in detail herein.

In a third aspect, the present disclosure provides an electronic device including a memory and a processor; the memory is configured to store program instructions; and the processor is configured to invoke the program instructions in the memory so that the electronic device executes the page display method for the application in the first aspect and any possible implementation of the first aspect.

In a fourth aspect, the present disclosure provides a computer storage medium including computer instructions that, when running on an electronic device, cause the electronic device to execute the page display method for the application in the first aspect and any possible implementation of the first aspect.

In a fifth aspect, the present disclosure provides a computer program product that, when running on a computer, cause a computer to execute the page display method for the application in the first aspect and any possible implementation of the first aspect.

In a sixth aspect, the present disclosure provides a chip system, which is applied to an electronic device including a display, a memory and a sensor; the chip system includes a processor; when the processor executes computer instructions stored in the memory, the electronic device executes the page display method for the application in the first aspect and any possible implementation of the first aspect.

DESCRIPTION OF THE DRAWINGS

The accompanying drawings, which are incorporated in and constitute a part of the present specification, illustrate embodiments according to the present disclosure, and serve to interpret the principle of the present disclosure together with the specification.

In order to more clearly illustrate technical solutions in the present disclosure or in the prior art, the accompanying drawings required to be used in the embodiments or prior art descriptions will be described, and it is obvious that for those skilled in the art, other figures can be obtained in accordance with these figures without creative effort.

FIGS. 3A-3E are schematic diagrams of human-machine interaction interfaces provided by embodiments of the present disclosure;

DETAILED DESCRIPTION OF PREFERRED EMBODIMENTS

Figure 1:
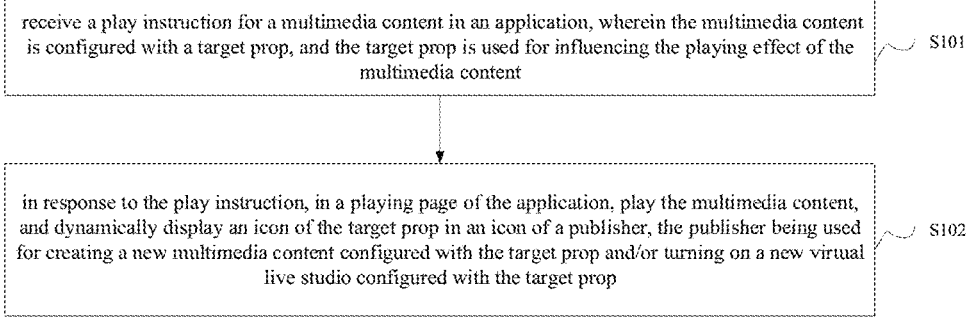
FIG. 1 is a flow diagram of a page display method for an application provided by an embodiment of the present disclosure.

In order to make the objects, technical solutions, and advantages of the present disclosure more clear, the technical solutions in the present disclosure will be further described. It should note that the embodiments and features in the embodiments of the present disclosure can be combined without conflicting with each other.

In the following description, many specific details are set forth in order to fully understand the disclosure, but the disclosure can also be implemented in other ways different from those described herein; Obviously, the embodiments in the specification are only part of the embodiments of this disclosure, not all of them.

Exemplarily, the present disclosure provides a method, apparatus, device, computer storage medium and computer program product for page display of an application, which can realize functional combination of props and publishers by means of icons of props and publishers, and realize dynamic display of icons of props in the icons of publishers. During the application plays a multimedia content, an icon of a prop configured in the multimedia content can be dynamically displayed in an icon of a publisher, so that the user can create a new multimedia content configured with the prop and/or turn on a new virtual live studio configured with the prop. Therefore, the prop configured in the multimedia content can be presented to the user interestingly, more users can be attracted to utilize the same prop to create a multimedia content and turn on a virtual live studio in the application, the user's interesting in a creating a multimedia content and turning on a virtual live studio in the application can be improved, the click rate, submission rate and interactivity can be increased, the complicated degree of operations to be adopted when the user utilizes props can be reduced, and user's experience in using the application can be improved.

The page display method for the application of the present disclosure can be executed by an electronic device or a live application (APP), webpage, public accounts in the electronic device. Electronic devices can be tablet computers, mobile phones, wearable devices, vehicle-mounted devices, augmented reality (AR)/virtual reality (VR) devices, notebook computers, ultra-mobile personal computer (UMPC), netbooks, personal digital assistant (PDAs), smart TVs, smart screens, high-definition TVs, 4K TVs, smart speakers, smart projectors, etc., and the specific types of electronic devices are not limited in any way in the present disclosure.

Among others, the type of operating system of electronic device is not limited in any way in the present disclosure, and can be, for example, Android system, Linux system, Windows system, iOS system, etc.

Based on the foregoing description, the embodiment of this disclosure takes the electronic device as an example, and elaborates the page display method for the application provided by this disclosure in combination with the drawings and application scenarios.

FIG. 1 is a flow diagram of a page display method for an application provided by an embodiment of the present disclosure. As shown in FIG. 1, the page display method for the application provided by the present disclosure may include:

S101: receiving a play instruction for a multimedia content in an application, wherein the multimedia content is configured with a target prop, and the target prop is used for influencing the playing effect of the multimedia content.

Users can publish a multimedia content without configured with a prop in the application, or publish a multimedia content configured with a prop in the application, so that the application can present various types of multimedia contents to each user.

Among them, a prop is used for influencing the playing effect of the multimedia content. This disclosure does not limit the type of application, the type of multimedia content, and the number and type of props configured in the multimedia content. In some embodiments, the prop can add a dynamic effect of car appearance in the multimedia content, can soften a portrait in the multimedia content, or can add a landscape painting as background in the multimedia.

After the application is started, the electronic device can receive a play instruction for a multimedia content configured with target prop(s). Among them, the number of target props can be one or more props, and the multimedia content configured with the target props has been published in the application. The play instruction is used to instruct to play the multimedia content configured with the target props. This disclosure does not limit the specific implementations of target props and the play instruction. In some embodiments, the play instruction may be implemented using operations such as clicking, double clicking, long pressing, sliding, etc.

S102. in response to the play instruction, in a playing page of the application, playing the multimedia content, and dynamically displaying an icon of the target prop in an icon of a publisher, the publisher being used for creating a new multimedia content configured with the target prop and/or turning on a new virtual live studio configured with the target prop.

Upon receiving the play instruction, the electronic device can play the multimedia content in the playing page of the application by using the playing effect brought by the target prop, and at the same time, dynamically display the icon of the target prop in the icon of a publisher, so that the user can create a new multimedia content configured with the target prop and/or turn on a new virtual live studio configured with the target prop through the publisher.

Among them, the playing page is a page in the application, which is used to show a set of functions of the application, such as playing multimedia contents and displaying publishers, etc. This disclosure does not limit the specific implementations of the playing page, icons of the target prop and the publisher.

Therefore, the problem that the publisher and props are displayed in different areas in the application can be avoided, the area in the application displaying the publisher can be fully utilized to give props more interesting exposure opportunities, and the publisher and props can be vividly displayed at the same time, which is convenient for users to create a new multimedia content and/or turn on a new virtual live studio in the application by using the same target prop, it is beneficial to improve the probability of users creating and publishing multimedia contents and/or turning on a virtual live studio to realize interaction in the application, and also avoids a phenomenon that users need to adopt complicated operations when using props, so that users can quickly determine the props to use.

According to the page display method of the application provided by the present disclosure, upon a play instruction for a multimedia content in an application configured with a target prop is received, in a playing page of the application, the multimedia content can be played, and an icon of the target prop can be dynamically displayed in an icon of a publisher, which can realize functional combination of the publisher and the prop, so that the user can create a new multimedia content configured with the target prop and/or turn on a new virtual live studio configured with the target prop. Therefore, while the application plays the multimedia content, dynamic presentation of the prop in the publisher can be implemented vividly, which can present the prop configured in the multimedia content interestingly, and solve a problem of lack of guiding users to perform creation and/or interaction in the application, increase the probability and interest that the application reminds users to use the prop for creation and/or turn on a virtual live studio for interaction, prompt more users to create and/or output contents in the application, and also avoid a phenomenon that users need to adopt complicated operations when using props, so that users can use props conveniently and quickly, and the user's experience in using the application can be improved.

Based on the description of the above embodiment, the electronic device can judge whether the icon of the target prop matches the icon of the publisher, so as to determine the manner of dynamically displaying the target prop.

The matching here refers to whether the shapes of icons are the same, or whether the shapes of icons of props can be changed.

In some embodiments, when the icon of the target prop does not match the icon of the publisher, the electronic device can cause the icon of the target prop from interior of the icon of the publisher to penetrate to exterior of the publisher for dynamic displaying, for example, the icon of the target prop is animated in the icon of the publisher as described above.

Therefore, the dynamic effect that the icon of prop penetrates through the icon of the publisher is achieved, which can more attract users to use the prop for creation, and the enjoyment and interest of prop presentation can be improved.

In other embodiments, when the icon of the target prop matches the icon of the publisher, the electronic device can change the icon of the target prop from a decreased state located inside the icon of the publisher to an enlarged state embedded in the icon of the publisher for dynamic display, for example, the icon of the target prop is animated in the icon of the publisher as described above.

Therefore, the dynamic effect of enlarging the icon of prop from small to large to be full of the icon of publisher can be achieved, which can more attract users to use the prop for creation, and the enjoyment and interest of prop presentation can be improved.

Based on the description of the above embodiments, in combination with FIGS. 2A-2E and 3A-3E, the specific implementation process of the electronic device dynamically displaying the icon of the target prop in the icon of the publisher is described in detail.

FIGS. 2A-2E illustrate schematic diagrams of human-machine interaction interfaces provided by embodiments of the present disclosure, and FIGS. 3A-3E illustrate schematic diagrams of human-machine interaction interfaces provided by embodiments of the present disclosure. For convenience of explanation, in FIGS. 2A-2E, and FIGS. 3A-3E, there illustrates an example in which the electronic device is a mobile phone, and a short video social APP (abbreviated as application 1) is installed in the mobile phone.

In this disclosure, scenario 1 is set as the implementation process of FIGS. 2A-2E, and scenario 2 is set as the implementation process of FIGS. 3A-3E. FIGS. 2A-2E differ from FIGS. 3A-3E in that the icons of publishers are different. The same thing in FIGS. 2A-2E and FIGS. 3A-3E is that the icons of props can be dynamically displayed in the icons of publishers.

Scenario 1

Figure 2A:
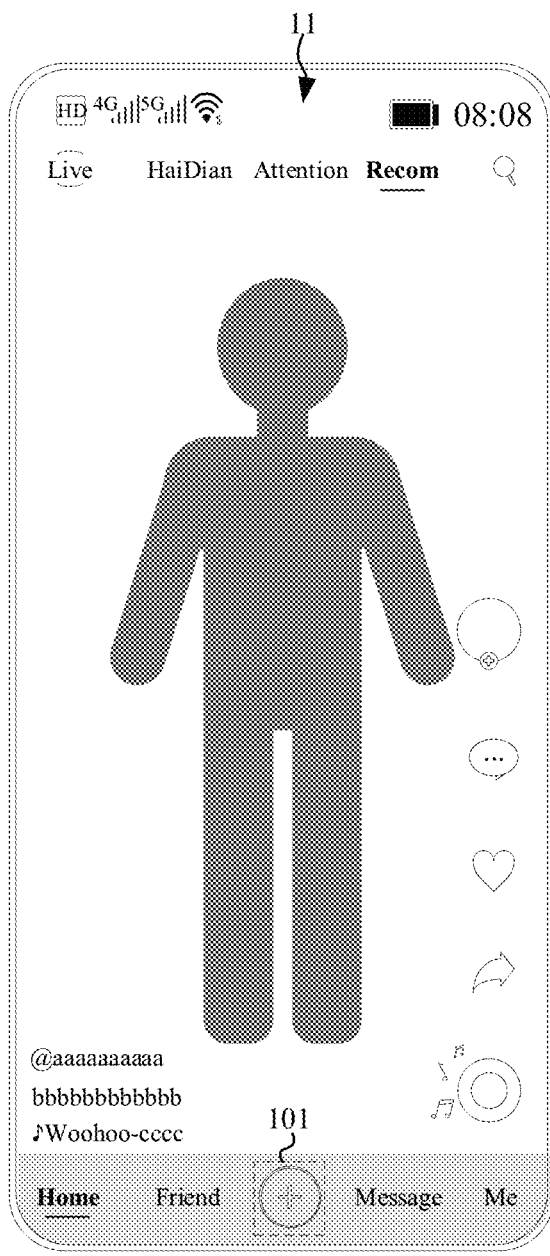
FIGS. 2A-2E are schematic diagrams of human-machine interaction interfaces provided by embodiments of the present disclosure.

The application 1 can display on the mobile phone the user interface 11 as shown in FIG. 2A, the user interface 11 is used to display the playing page in the application 1, and the application 1 can perform a certain set of functions in the playing page of the application 1, such as playing a multimedia content (such as video 1) and displaying a publisher.

The user interface 11 can play video 1 which is not configured with props, and the user interface 11 can include a control 101 for indicating that the user can trigger the control 101 in the user interface 11, and the control 101 is used to trigger the creation of multimedia content and/or the turning-on of virtual live studio. In this disclosure, parameters of the control 101 such as shape, size, color, position, and so on are not limited.

Figure 2B:
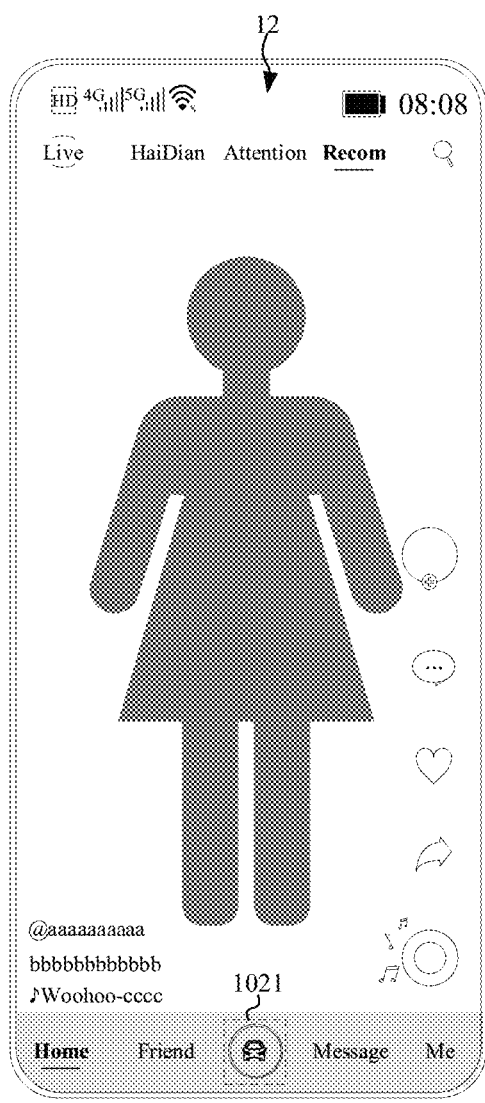
Figure 2C:
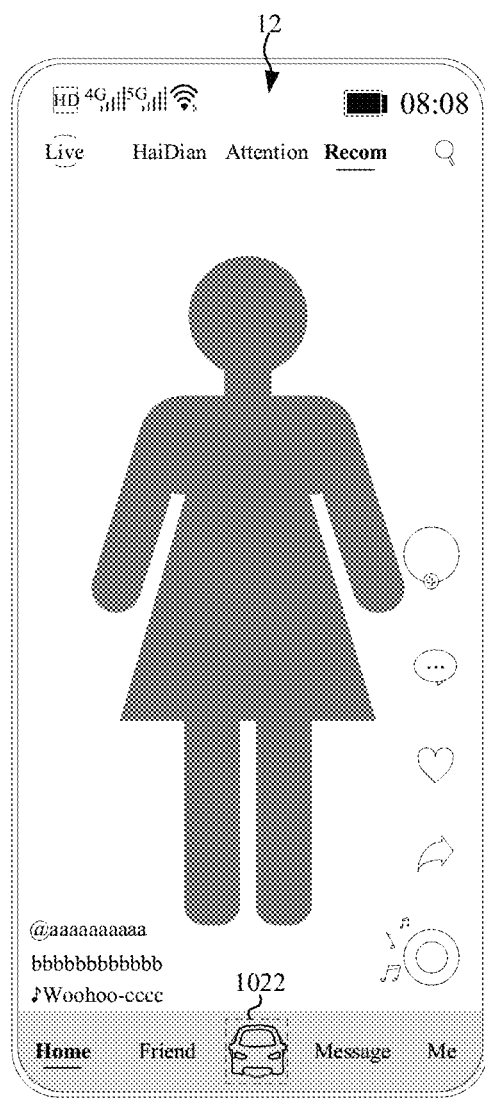

Upon the application 1 receives the user's sliding operation in the user interface 11 as shown in FIG. 2A, if another multimedia content (such as video 2) is configured with a prop, in the mobile phone, the user interface 12 shown in FIG. 2B is first displayed and then the user interface 12 shown in FIG. 2C is displayed, the user interface 12 is used to update and display the playing page in the application 1, such as playing another multimedia content and dynamically displaying the icon of prop in the icon of the publisher.

The user interface 12 can play video 2, and the user interface 12 can include a dynamically variable control, that is, the control can be gradually displayed from the control 1021 in FIG. 2B to the control 1022 in FIG. 2C, which indicates that the user can trigger the control in the user interface 12, and the control is used to trigger the creation of multimedia content and/or the turning-on of virtual live studio. In this disclosure, parameters of the control such as shape, size, color, position, and so on are not limited.

When video 2 is configured with prop 1, the icon of prop 1 does not match the icon of control 101, therefore, a specific process of gradually displaying the control from the control 1021 in FIG. 2B to the control 1022 in FIG. 2C is a process that the icon of the prop 1 gradually penetrates through the icon of the control 101.

To sum up, the electronic device has realized the dynamic effect of the icon of the prop 1 penetrating through the icon of the publisher.

Figure 2D:
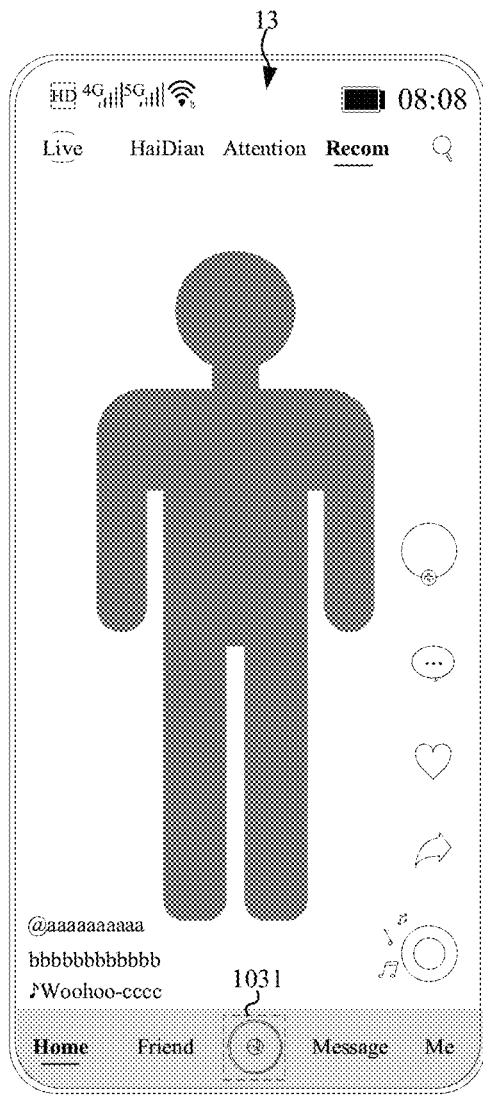
Figure 2E:
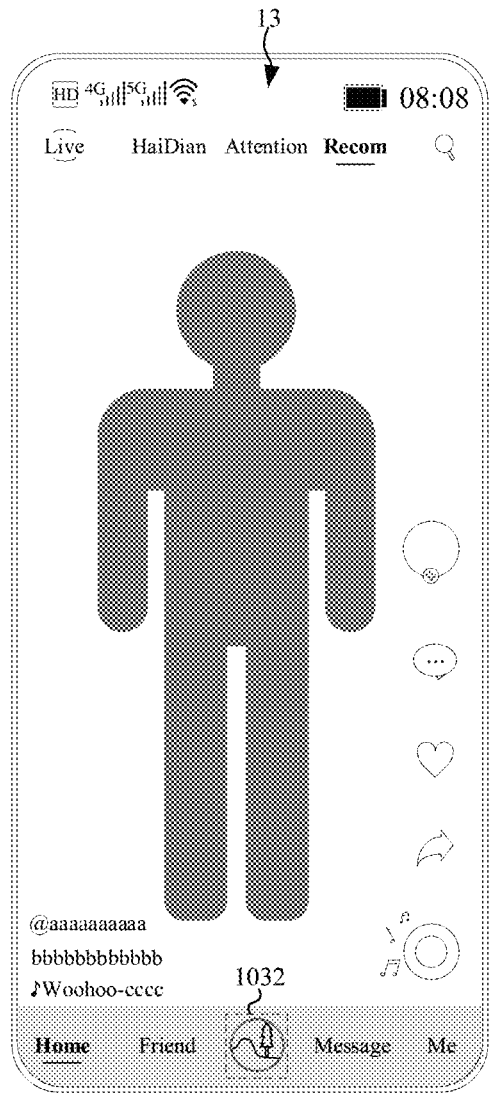

Upon the application 1 receives the user's sliding operation in the user interface 11 as shown in FIG. 2A, if another multimedia content (such as video 3) is configured with a prop, in the mobile phone, the user interface 13 shown in FIG. 2D is first displayed and then the user interface 13 shown in FIG. 2E is displayed, the user interface 13 is used to update and display the playing page in the application 1, such as playing another multimedia content and dynamically displaying the icon of prop in the icon of the publisher.

The user interface 13 can play video 3, and the user interface 13 can include a dynamically variable control, that is, the control can be gradually displayed from the control 1031 in FIG. 2D to the control 1032 in FIG. 2E, which indicates that the user can trigger the control in the user interface 13, and the control is used to trigger the creation of multimedia content and/or the turning-on of virtual live studio. In this disclosure, parameters of the control such as shape, size, color, position, and so on are not limited.

When video 3 is configured with prop 2, the icon of prop 2 matches the icon of control 101, therefore, a specific process of gradually displaying the control from the control 1031 in FIG. 2D to the control 1032 in FIG. 2E is a process that the icon of the prop 2 gradually enlarges from small to large to be full of the icon of the control 101.

To sum up, the electronic device has realized the dynamic effect of enlarging the icon of the prop 2 from small to large to be full of the icon of publisher.

Scenario 2

Figure 3A:
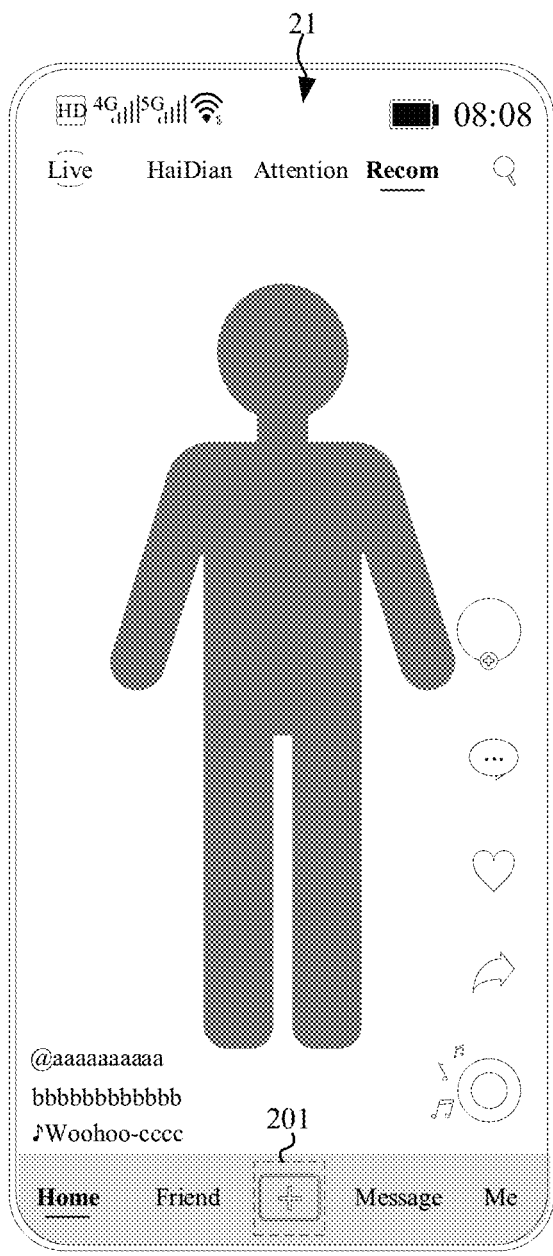

The application 1 can display on the mobile phone the user interface 21 as shown in FIG. 3A, the user interface 21 is used to display the playing page in the application 1, and the application 1 can perform a certain set of functions in the playing page of the application 1, such as playing a multimedia content (such as video 1) and displaying a publisher.

The user interface 21 can play video 1 which is not configured with props, and the user interface 21 can include a control 201 for indicating that the user can trigger the control 201 in the user interface 21, and the control 201 is used to trigger the creation of multimedia content and/or the turning-on of virtual live studio. In this disclosure, parameters of the control 201 such as shape, size, color, position, and so on are not limited.

Figure 3B:
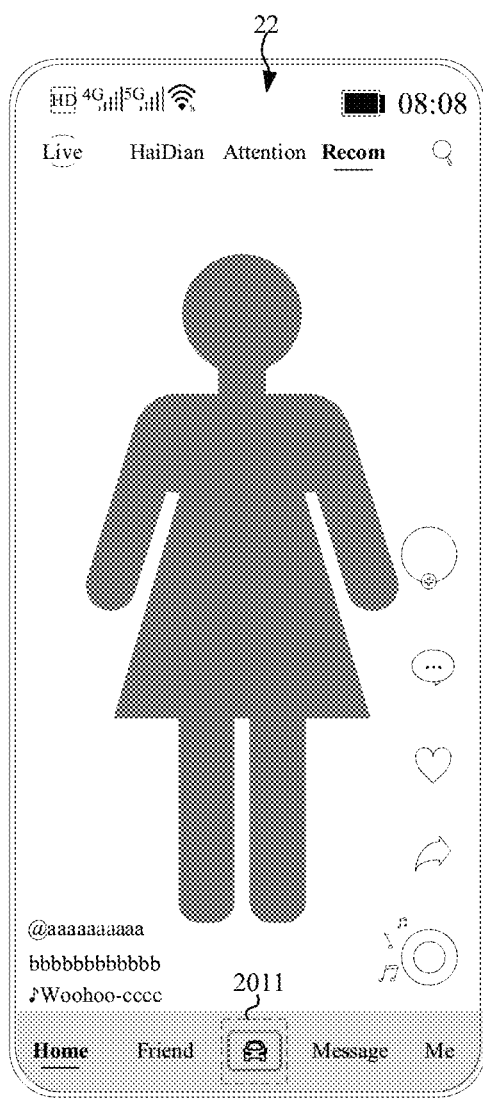
Figure 3C:
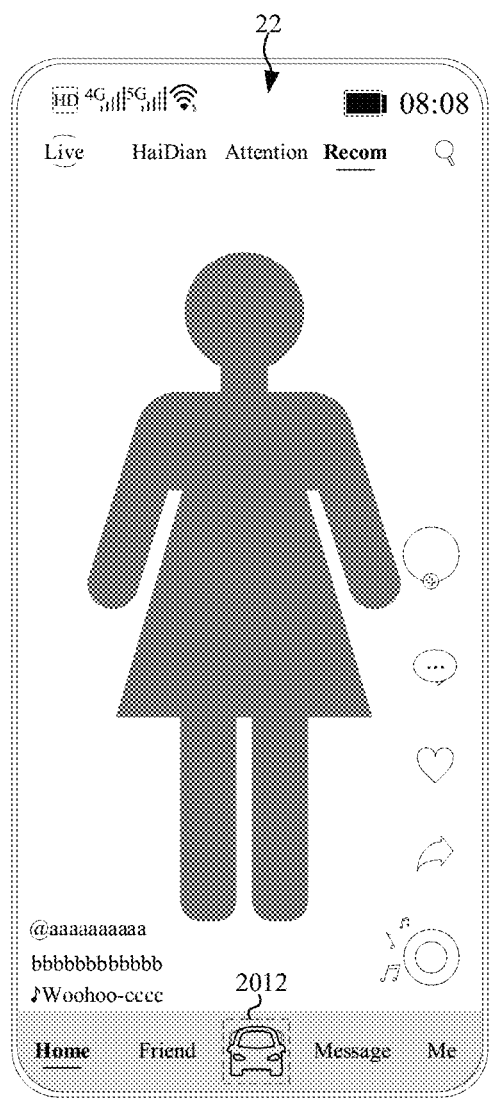

Upon the application 1 receives the user's sliding operation in the user interface 21 as shown in FIG. 3A, if another multimedia content (such as video 2) is configured with a prop, in the mobile phone, the user interface 22 shown in FIG. 3B is first displayed and then the user interface 22 shown in FIG. 3C is displayed, the user interface 22 is used to update and display the playing page in the application 1, such as playing another multimedia content and dynamically displaying the icon of prop in the icon of the publisher.

The user interface 22 can play video 2, and the user interface 22 can include a dynamically variable control, that is, the control can be gradually displayed from the control 2021 in FIG. 3B to the control 2022 in FIG. 3C, which indicates that the user can trigger the control in the user interface 22, and the control is used to trigger the creation of multimedia content and/or the turning-on of virtual live studio. In this disclosure, parameters of the control such as shape, size, color, position, and so on are not limited.

When video 2 is configured with prop 1, the icon of prop 1 does not match the icon of control 201, therefore, a specific process of gradually displaying the control from the control 2021 in FIG. 3B to the control 2022 in FIG. 3C is a process that the icon of the prop 1 gradually penetrates through the icon of the control 201.

To sum up, the electronic device has realized the dynamic effect of the icon of the prop 1 penetrating through the icon of the publisher.

Upon the application 1 receives the user's sliding operation in the user interface 21 as shown in FIG. 3A, if another multimedia content (such as video 3) is configured with a prop, in the mobile phone, the user interface 23 shown in FIG. 3D is first displayed and then the user interface 23 shown in FIG. 3E is displayed, the user interface 23 is used to update and display the playing page in the application 1, such as playing another multimedia content and dynamically displaying the icon of prop in the icon of the publisher.

The user interface 23 can play video 3, and the user interface 23 can include a dynamically variable control, that is, the control can be gradually displayed from the control 2031 in FIG. 3D to the control 2032 in FIG. 3E, which indicates that the user can trigger the control in the user interface 23, and the control is used to trigger the creation of multimedia content and/or the turning-on of virtual live studio. In this disclosure, parameters of the control such as shape, size, color, position, and so on are not limited.

When video 3 is configured with prop 2, the icon of prop 2 does not match the icon of control 201, therefore, a specific process of gradually displaying the control from the control 2031 in FIG. 3D to the control 2032 in FIG. 3E is a process that the icon of the prop 2 gradually enlarges from small to large to be full of the icon of the control 201.

To sum up, the electronic device has realized the dynamic effect of enlarging the icon of the prop 2 from small to large to be full of the icon of publisher.

It should be noted that, in addition to the implementation of switching from video 1 to video 2 in Scenario 1 and Scenario 2, if the multimedia content played by Application 1 after startup is configured with props, then Application 1 can play the multimedia content in the playing page and dynamically display the icon of prop in the icon of publisher.

Since the playing page realizes functional combination of the publisher and the prop, upon receipt of a trigger instruction by the user to the publisher in the playing page, the electronic device can display a shooting page of the application, so that the user can use a target prop conveniently and quickly, and it can avoid a phenomenon that users need to adopt complicated operations when using props.

The trigger instruction is used to trigger the display of the shooting page, which is used to create a new multimedia content configured with the target prop and/or turn on a new virtual live studio configured with the target prop, and the shooting page is a page in the application other than the playing page. The specific implements of the trigger instruction and the shooting page are not limited. In some embodiments, the trigger instruction may be implemented using operations acting on the publisher such as clicking, double clicking, long pressing, sliding, etc. Among them, the types of the multimedia contents are not limited.

Based on the description of the above embodiments, the electronic device can determine the icon of the publisher based on the type of multimedia content to be played in the playing page. It can be seen that with respect to different types of multimedia content, the icons of publishers can adopt different styles. Therefore, the user can quickly know the type of multimedia content in the playing page, which is convenient for the user to enter into a page with the same type of multimedia content for creation and/or turning on live broadcast.

In some embodiments, upon receipt of the user's sliding instruction on the playing page, the electronic device can acquire a type identification of multimedia content to be played in the playing page. The electronic device can add the type identification of the multimedia content into the icon of the publisher, and display the icon of the publisher in the playing page.

The sliding instruction is used to trigger the playing of multimedia content in the playing page. The type identifier is used to identify the type of multimedia content, such as shared multimedia or live picture in virtual live studio. This disclosure does not limit the specific implementations of sliding instruction and type identifier. In some embodiments, the slide instruction may be implemented by using a specific type of operation such as slide up, slide down, slide left, slide right, etc. The type identifier can be represented by letter, binary number, digital value, etc.

When the type identifier of multimedia content indicates that the type of the multimedia content is a shared multimedia content (i.e., video stream), the electronic device may add the type identifier of multimedia content into the icon of the publisher to obtain a first icon. Therefore, the electronic device can display the publisher of the first icon in the playing page, and at this time, the publisher is used for creating the multimedia content.

When the type identifier of multimedia content indicates that the type of multimedia content is a live picture in a virtual live studio (i.e., live stream), the electronic device may add the type identifier of multimedia content into the icon of the publisher to obtain a second icon. Therefore, the electronic device can display the publisher of the second icon in the playing page, and at this time, the publisher is used to turn on the virtual live studio.

The first icon and the second icon are different. This disclosure does not limit the specific implementations of the first icon and the second icon. In some embodiments, the first icon or the second icon can be displayed in the form of characters, letters, numbers, icons, pictures, videos, etc., and the first icon and the second icon can be distinguished by colors, characters, graphics, etc.

It should be noted that a prop (such as a target prop) may or may not be employed in the multimedia content to be played in the playing page, which is not limited by this disclosure.

When the multimedia content to be played in the playing page does not employ a prop, based on the description of the above embodiments, the specific implementation process of the first icon and the second icon of the publisher will be described in detail with reference to FIGS. 4A-4B.

Figure 4A:
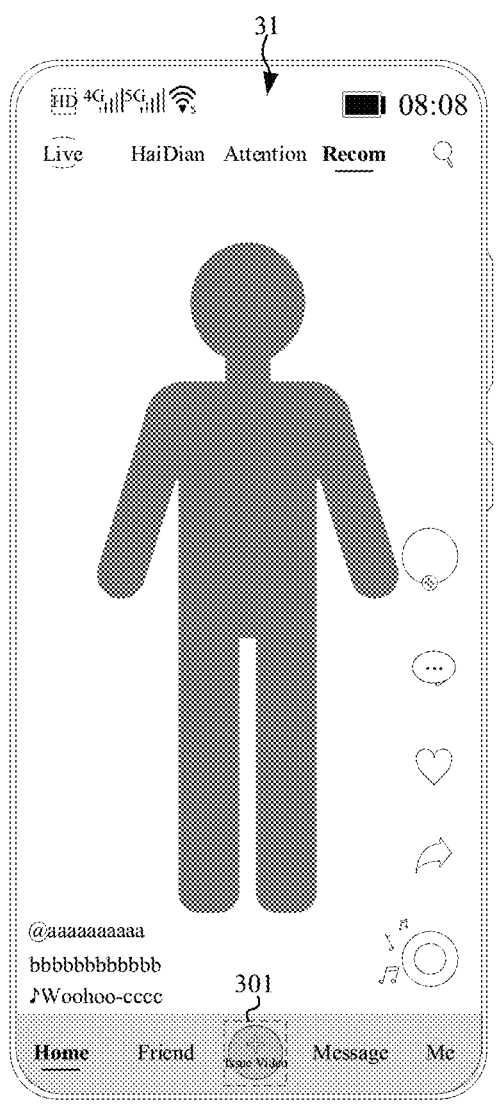
FIGS. 4A-4B are schematic diagrams of human-machine interaction interfaces provided by embodiments of the present disclosure.
Figure 4B:
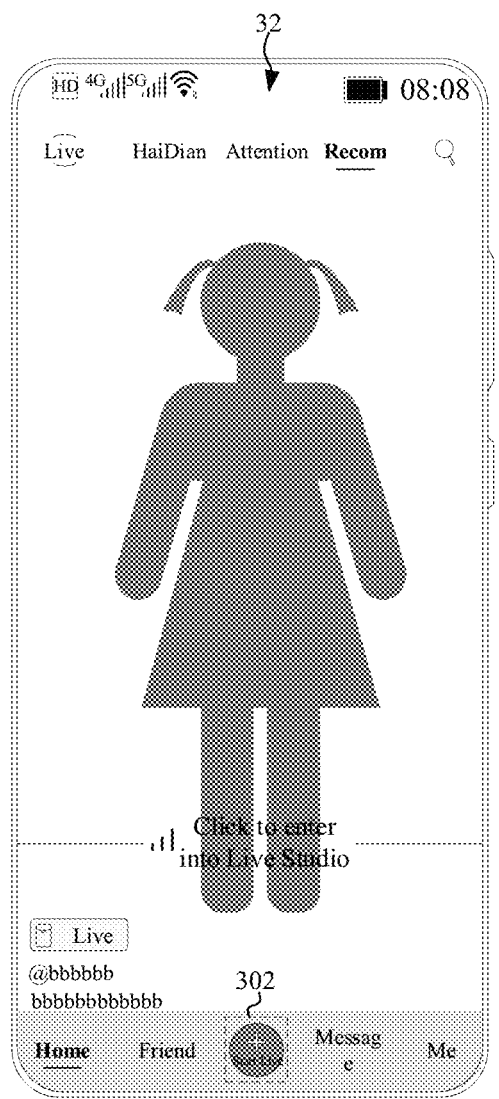

FIGS. 4A-4B are schematic diagrams of human-machine interaction interfaces provided by embodiments of the present disclosure. For convenience of explanation, in FIGS. 4A-4B, there illustrates an example in which the electronic device is a mobile phone, and a short video social APP (abbreviated as application 1) is installed in the mobile phone.

When the application 1 detects that the type of a multimedia content to be played which is not configured with the prop is shared multimedia content, the application 1 can display on the mobile phone the user interface 31 as exemplarily shown in FIG. 4A. the user interface 31 is used to display the playing page in the application 1, and the application 1 can perform a certain set of functions in the playing page of the application 1, such as playing a multimedia content (such as video 4) and displaying a publisher.

The user interface 31 can play video 4 which is not configured with props, and the user interface 31 can include a control 301 for indicating that the user can trigger the control 301 in the user interface 31, and the control 301 is used to trigger the creation of multimedia content. In this disclosure, parameters of the control 301 such as shape, size, color, position, and so on are not limited.

To sum up, the electronic device employs the first icon to present the publisher in the playing page, so that the user can quickly acquire the type of the current multimedia content, and the user is provided with an entrance to create and publish the multimedia content.

When the application 1 detects that the type of a multimedia content to be played which is not configured with the prop is a live picture in the virtual live studio, the application 1 can display on the mobile phone the user interface 32 as exemplarily shown in FIG. 4B, the user interface 32 is used to display the playing page in the application 1, and the application 1 can perform a certain set of functions in the playing page of the application 1, such as playing a multimedia content (such as video 5 utilizing the live picture) and displaying a publisher.

The user interface 32 can play video 5 which is not configured with props, and the user interface 32 can include a control 302 for indicating that the user can trigger the control 302 in the user interface 32, and the control 302 is used to trigger the turning-on of the virtual live studio. In this disclosure, parameters of the control 302 such as shape, size, color, position, and so on are not limited.

To sum up, the electronic device employs the second icon to present the publisher in the playing page, so that the user can quickly acquire the type of the current multimedia content, and the user is provided with an entrance to turn on the virtual live studio.

Based on the description of the above embodiment, upon receipt of a configuration instruction corresponding to shaking of an electronic device, the electronic device displays the publisher with a deformed icon in the playing page. Therefore, the icon of the publisher can shake along with the shaking of the electronic device.

Among them, shaking can also be referred to as vibrating, which can be understood as angular and/or displacement offset of the electronic device in one or more directions. The configuration instruction is used to trigger the display of the publisher with deformed icon and determine the parameters of the publisher's icon such as rotation angle, rotation direction, deformation rate, deformation area, deformation color and so on. This disclosure does not limit the specific implementation of the configuration instruction.

Based on the description of the above embodiments, the specific implementation process of the first icon and the second icon of the publisher will be described in detail with reference to FIGS. 4A-4B.

Figure 5A:
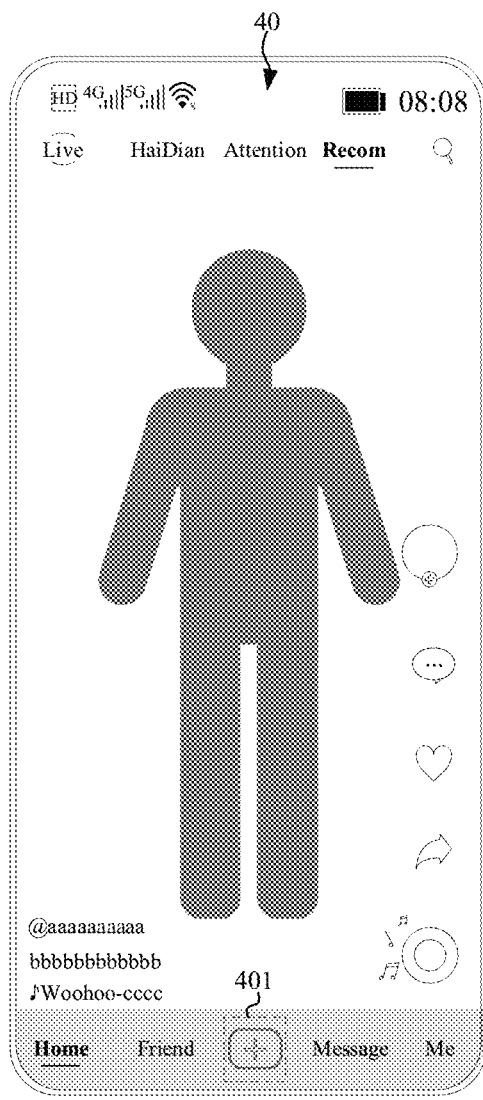
FIGS. 5A-5B are schematic diagrams of human-machine interaction interfaces provided by embodiments of the present disclosure.
Figure 5B:
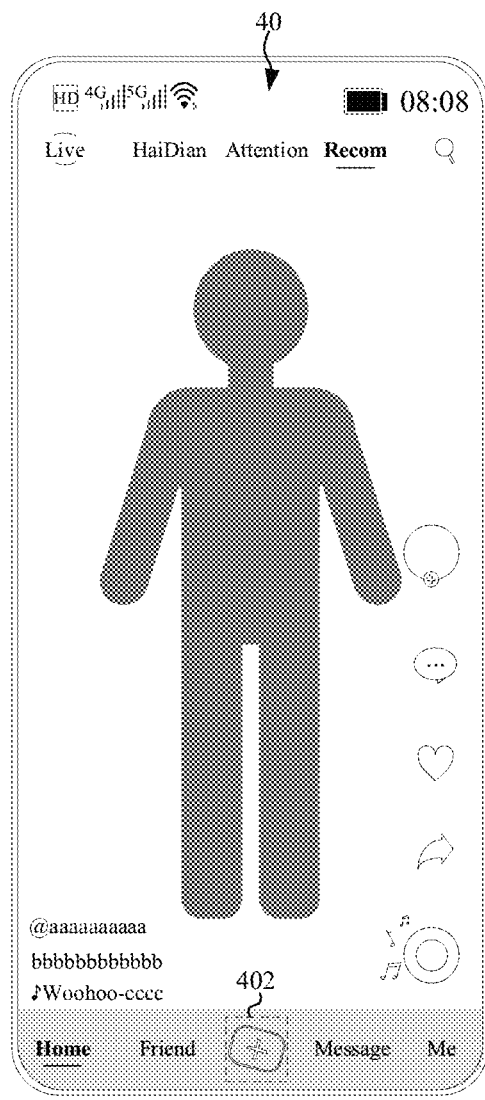

FIGS. 5A-5B are schematic diagrams of human-machine interaction interfaces provided by embodiments of the present disclosure. For convenience of explanation, in FIGS. 5A-5B, there illustrates an example in which the electronic device is a mobile phone, and a short video social APP (abbreviated as application 1) is installed in the mobile phone.

The application 1 can display on the mobile phone the user interface 40 as exemplarily shown in FIG. 5A. the user interface 40 is used to display the playing page in the application 1, and the application 1 can perform a certain set of functions in the playing page of the application 1, such as playing a multimedia content (such as video 6) and displaying a publisher.

The user interface 40 can play video 6 which is not configured with props, and the user interface 40 can include a control 401 for indicating that the user can trigger the control 401 in the user interface 40, and the control 401 is used to trigger the creation of multimedia content. In this disclosure, parameters of the control 401 such as shape, size, color, position, and so on are not limited.

When the application 1 detects that the mobile phone rotates to the right, the application 1 can display on the user interface 40 the control 402 as shown in FIG. 4B, and the control 401 is used to trigger the creation of multimedia content and/or turning-on of the virtual live studio. In this disclosure, parameters of the control 402 such as shape, size, color, position, and so on are not limited.

It can be seen that the icon of the control 402 is deformed compared with the icon of the control 401.

To sum up, the electronic device displays the publisher with deformed icon along with the shaking of the electronic device, which enriches the display effect of the publisher.

Exemplarily, the present disclosure provides a page display apparatus for an application.

Figure 6:
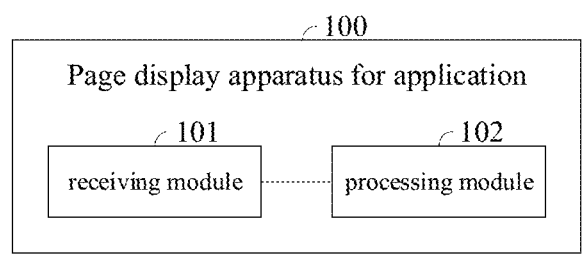
FIG. 6 is a structural schematic diagram of a page display apparatus for an application provided by an embodiment of the present disclosure.

FIG. 6 is a structural diagram of a page display apparatus for an application provided by an embodiment of the present disclosure. The page display apparatus for the application according to the present disclosure can be set in an electronic device, and can implement operations of the electronic device corresponding to the page display method for the application according to the embodiments of FIGS. 1-5B described above.

As shown in FIG. 6, the page display apparatus 100 for the application provided by the present disclosure may include a receiving module 101 and a processing module 102.

The receiving module 101 is configured to receive a play instruction for a multimedia content in an application, wherein the multimedia content is configured with a target prop, and the target prop is used for influencing the playing effect of the multimedia content;

The processing module 102 is configured to, in response to the play instruction, in a playing page of the application, play the multimedia content, and dynamically display an icon of the target prop in an icon of a publisher, the publisher being used for creating a new multimedia content configured with the target prop and/or turning on a new virtual live studio configured with the target prop.

In some embodiments, the processing module 102 is configured to, when the icon of the target prop does not match the icon of the publisher, cause the icon of the target prop from interior of the icon of the publisher to penetrate to exterior of the publisher for dynamic displaying.

In some embodiments, the processing module 102 is configured to, when the icon of the target prop matches the icon of the publisher, change the icon of the target prop from a decreased state located inside the icon of the publisher to an enlarged state embedded in the icon of the publisher for dynamic display.

In some embodiments, the processing module 102 is further configured to, upon receipt of a trigger instruction to the publisher, display a shooting page of the application, wherein the shooting page is used for creating a new multimedia content configured with the target prop and/or turning on a new virtual live studio configured with the target prop.

In some embodiments, the processing module 102 is further configured to, upon receipt of a sliding instruction for the playing page, acquire a type identifier of the multimedia content; add the type identifier of the multimedia content into the icon of the publisher; and display the icon of the publisher in the playing page.

In some embodiments, when the type identifier of the multimedia content indicates that the type of the multimedia content is a shared multimedia content, the publisher is used for creating multimedia contents; or, when the type identifier of the multimedia content indicates that the type of the multimedia content is a live picture in a virtual live studio, the publisher is used to turn on the virtual live studio.

In some embodiments, the processing module 102 is configured to, upon the receiving module 101 receives a configuration instruction corresponding to shaking of an electronic device, display the publisher with a deformed icon in the playing page.

The page display apparatus for the application provided by this disclosure can execute the above method embodiment, and its specific implementation principle and technical effect can refer to the above method embodiment, and will not be repeated herein.

Exemplarily, the present disclosure provides an electronic device including one or more processors; memory; and one or more computer programs; wherein one or more computer programs are stored in the memory; and when the one or more processors execute the one or more computer programs, the electronic device can realize the page display method for the application according to the previous embodiment.

Exemplarily, the present disclosure provides a chip system, which is applied to an electronic device including a display, a memory and a sensor; the chip system includes a processor; when the processor executes computer instructions stored in the memory, the electronic device executes the page display method for the application according to the previous embodiment.

Exemplarily, the present disclosure provides a computer-readable storage medium on which a computer program is stored, and the computer program, when executed by a processor, cause an electronic device to execute the page display method for the application according to the previous embodiment.

Exemplarily, the present disclosure provides a computer program product that, when the computer program product runs on a computer, causes the computer to execute the page display method for the application according to the previous embodiment.

In the above embodiments, all or part of the functions can be realized by software, hardware, or a combination of software and hardware. When implemented in software, the functions can be implemented in whole or in part in the form of a computer program product. A computer program product includes one or more computer instructions. When computer program instructions are loaded and executed on a computer, the flow or function according to embodiments of the present disclosure is generated in whole or in part. The computer can be a general purpose computer, a special purpose computer, a computer network, or other programmable devices. Computer instructions may be stored in a computer-readable storage medium. Computer-readable storage medium can be any available medium that can be accessed by computers, or a data storage device that integrates one or more available medium, such as server and data center. The available medium can be magnetic medium (e.g., floppy disk, hard disk, magnetic tape), optical medium (e.g., DVD), or semiconductor medium (e.g., solid state disk (SSD)), etc.

It should be noted that in this paper, relational terms such as "first" and "second" are only used to distinguish one entity or operation from another entity or operation, and do not necessarily require or imply any such actual relationship or order exists between these entities or operations. Furthermore, the terms "include", "comprise" or any other variation thereof are intended to cover non-exclusive inclusion, so that a process, method, article or equipment including a series of elements includes not only those elements, but also other elements not explicitly listed, or further includes elements inherent to such process, method, article or equipment. Without further limitation, the element defined by the sentence "including one . . . " does not exclude that there are other identical elements in the process, method, article or equipment including the element.

The above is only specific embodiments of this disclosure, so that those skilled in the art can understand or realize this disclosure. Various modifications to these embodiments will be apparent to those skilled in the art, and the general principles defined herein may be implemented in other embodiments without departing from the spirit or scope of this disclosure. Therefore, this disclosure will not be limited to the embodiments described herein, but should be accorded to the widest scope consistent with the principles and novel features disclosed herein.

What is claimed is:

1. A page display method for an application, comprising:
   receiving a play instruction for a multimedia content in an application, wherein the multimedia content is generated by adopting a target prop, and the target prop is used for influencing the playing effect of the multimedia content;
   in response to the play instruction, in a playing page of the application, playing the multimedia content, and dynamically displaying an icon of the target prop in an icon of a publisher, the publisher being used for creating a new multimedia content configured with the target prop and/or turning on a new virtual live studio configured with the target prop.

2. The method of claim 1, wherein, when the icon of the target prop does not match the icon of the publisher, the dynamically displaying the icon of the target prop in the icon of the publisher comprises:
   causing the icon of the target prop from interior of the icon of the publisher to penetrate to exterior of the publisher for dynamic displaying.

3. The method of claim 1, wherein, when the icon of the target prop matches the icon of the publisher, the dynamically displaying the icon of the target prop in the icon of the publisher comprises:
   changing the icon of the target prop from a decreased state located inside the icon of the publisher to an enlarged state embedded in the icon of the publisher for dynamic display.

4. The method of claim 1, wherein, the method further comprises:
   upon receipt of a trigger instruction to the publisher, displaying a shooting page of the application, wherein the shooting page is used for creating a new multimedia content configured with the target prop and/or turning on a new virtual live studio configured with the target prop.

5. The method of claim 1, wherein, the method further comprises:
   upon receipt of a sliding instruction for the playing page, acquiring a type identifier of the multimedia content;
   adding the type identifier of the multimedia content into the icon of the publisher; and
   displaying the icon of the publisher in the playing page.

6. The method of claim 5, wherein,
when the type identifier of the multimedia content indicates that the type of the multimedia content is a shared multimedia content, the publisher is used for creating multimedia contents; or,
when the type identifier of the multimedia content indicates that the type of the multimedia content is a live picture in a virtual live studio, the publisher is used to turn on the virtual live studio.

7. The method of claim 1, wherein, the method further comprises:
upon receipt of a configuration instruction corresponding to shaking of an electronic device, displaying the publisher with a deformed icon in the playing page.

8. An electronic device comprising:
one or more processors; and
a memory, wherein one or more computer programs are stored in the memory;
wherein the one or more computer programs, when executed by the one or more processors, cause the electronic device to:
receive a play instruction for a multimedia content in an application, wherein the multimedia content is configured with a target prop, and the target prop is used for influencing the playing effect of the multimedia content; and
in response to the play instruction, in a playing page of the application, play the multimedia content, and dynamically display an icon of the target prop in an icon of a publisher, the publisher being used for creating a new multimedia content configured with the target prop and/or turning on a new virtual live studio configured with the target prop.

9. The electronic device of claim 8, wherein, the one or more computer programs, when executed by the one or more processors, cause the electronic device further to:
when the icon of the target prop does not match the icon of the publisher, cause the icon of the target prop from interior of the icon of the publisher to penetrate to exterior of the publisher for dynamic displaying of the icon of the target prop.

10. The electronic device of claim 8, wherein, the one or more computer programs, when executed by the one or more processors, cause the electronic device further to:
when the icon of the target prop matches the icon of the publisher, change the icon of the target prop from a decreased state located inside the icon of the publisher to an enlarged state embedded in the icon of the publisher for dynamic displaying of the icon of the target prop.

11. The electronic device of claim 8, wherein, the one or more computer programs, when executed by the one or more processors, cause the electronic device further to:
upon receipt of a trigger instruction to the publisher, display a shooting page of the application, wherein the shooting page is used for creating a new multimedia content configured with the target prop and/or turning on a new virtual live studio configured with the target prop.

12. The electronic device of claim 8, wherein, the one or more computer programs, when executed by the one or more processors, cause the electronic device further to:
upon receipt of a sliding instruction for the playing page, acquire a type identifier of the multimedia content; add the type identifier of the multimedia content into the icon of the publisher; and display the icon of the publisher in the playing page.

13. The electronic device of claim 8, wherein, when the type identifier of the multimedia content indicates that the type of the multimedia content is a shared multimedia content, the publisher is used for creating multimedia contents; or,
when the type identifier of the multimedia content indicates that the type of the multimedia content is a live picture in a virtual live studio, the publisher is used to turn on the virtual live studio.

14. The electronic device of claim 8, wherein, the one or more computer programs, when executed by the one or more processors, cause the electronic device further to:
upon receipt of a configuration instruction corresponding to shaking of an electronic device, display the publisher with a deformed icon in the playing page.

15. A non-transitory computer storage medium, comprising computer instructions which, when running on an electronic device, cause the electronic device to
receive a play instruction for a multimedia content in an application, wherein the multimedia content is configured with a target prop, and the target prop is used for influencing the playing effect of the multimedia content; and
in response to the play instruction, in a playing page of the application, play the multimedia content, and dynamically display an icon of the target prop in an icon of a publisher, the publisher being used for creating a new multimedia content configured with the target prop and/or turning on a new virtual live studio configured with the target prop.

16. The non-transitory computer storage medium of claim 15, wherein, the computer instructions which, when running on the electronic device, cause the electronic device further to:
when the icon of the target prop does not match the icon of the publisher, cause the icon of the target prop from interior of the icon of the publisher to penetrate to exterior of the publisher for dynamic displaying of the icon of the target prop.

17. The non-transitory computer storage medium of claim 15, wherein, the computer instructions which, when running on the electronic device, cause the electronic device further to:
when the icon of the target prop matches the icon of the publisher, change the icon of the target prop from a decreased state located inside the icon of the publisher to an enlarged state embedded in the icon of the publisher for dynamic displaying of the icon of the target prop.

18. The non-transitory computer storage medium of claim 15, wherein, the computer instructions which, when running on the electronic device, cause the electronic device further to:
upon receipt of a trigger instruction to the publisher, display a shooting page of the application, wherein the shooting page is used for creating a new multimedia content configured with the target prop and/or turning on a new virtual live studio configured with the target prop.

19. The non-transitory computer storage medium of claim 15, wherein, the computer instructions which, when running on the electronic device, cause the electronic device further to:
upon receipt of a sliding instruction for the playing page, acquire a type identifier of the multimedia content; add the type identifier of the multimedia content into the icon of the publisher; and display the icon of the publisher in the playing page.

20. The non-transitory computer storage medium of claim 15, wherein, the computer instructions which, when running on the electronic device, cause the electronic device further to:
  upon receipt of a configuration instruction corresponding to shaking of an electronic device, display the publisher with a deformed icon in the playing page.

* * * * *